(12) United States Patent
Quapil

(10) Patent No.: US 6,488,328 B2
(45) Date of Patent: Dec. 3, 2002

(54) SUN VISOR FOR MOTOR VEHICLES

(75) Inventor: Olaf Quapil, Backnang (DE)

(73) Assignee: Reitter & Schefenacker GmbH & Co. KG, Esslingen (DE)

(*) Notice: Subject to any disclaimer, the term of this patent is extended or adjusted under 35 U.S.C. 154(b) by 0 days.

(21) Appl. No.: 09/882,294

(22) Filed: Jun. 15, 2001

(65) Prior Publication Data
US 2002/0033614 A1 Mar. 21, 2002

(30) Foreign Application Priority Data
Jun. 17, 2000 (DE) .......................... 100 29 906

(51) Int. Cl.$^7$ ................................ B60J 3/02
(52) U.S. Cl. ..................... 296/97.8; 296/97.4
(58) Field of Search .................. 296/97.1, 97.6, 296/97.8, 97.11, 97.4, 97.9

(56) References Cited

U.S. PATENT DOCUMENTS

| 4,989,910 A | * | 2/1991 | Mersman et al. ...... 296/97.4 X |
| 5,104,174 A | * | 4/1992 | Gute .................... 296/97.4 |
| 5,855,405 A | * | 1/1999 | Robles ................. 296/97.4 |
| 6,293,607 B1 | * | 9/2001 | Sasanuma ............ 296/97.11 |
| 2001/0022452 A1 | * | 9/2001 | Bauer et al. .......... 296/97.4 |

FOREIGN PATENT DOCUMENTS

| DE | 2258005 | * | 5/1974 | ............... 296/97.8 |
| EP | 563544 A1 | * | 10/1993 | ............... 296/97.8 |

* cited by examiner

Primary Examiner—D. Glenn Dayoan
Assistant Examiner—Jason Morrow
(74) Attorney, Agent, or Firm—Gudrun E. Huckett

(57) ABSTRACT

A sun visor arrangement for a motor vehicle is connected to at least one support of the motor vehicle and is configured to be moveable from a stowed position into a shading position. The sun visor arrangement has a sun visor and one or more screen parts connected to the sun visor. The screen part is configured to be moveable from a rest position into a position of use and back.

23 Claims, 10 Drawing Sheets

SUN VISOR FOR MOTOR VEHICLES

BACKGROUND OF THE INVENTION

1. Field of the Invention

The invention relates to a sun visor arrangement for vehicles, preferably motor vehicles. The sun visor arrangement is moveable from a stowed position into a shading position and is secured on at least one support provided on the vehicle.

2. Description of the Related Art

Motor vehicles are generally provided in the area above the windshield with two sun visors, one for the driver and one for the front passenger. These sun visors are pivotably supported. When the driver and/or the front passenger are blinded by the sun, the sun visors are folded down from the stowed position into the shading position. Depending on the position of the sun, the shading action of the sun visor is often insufficient.

SUMMARY OF THE INVENTION

It is an object of the present invention to configure the sun visor of the aforementioned kind such that the driver and/or the front passenger are protected optimally against the impinging sun light.

In accordance with the present invention, this is achieved in that than the sun visor comprises at least one screen part which can be moved from the rest position into a position of use.

The sun visor arrangement according to the invention is provided with a screen part which provides additional shading protection for the driver and/or the front passenger when in the position of use. The screen part can be moved, like the sun visor itself, from its rest position (stowed position) into a position of use and vice versa.

DESCRIPTION OF THE PREFERRED EMBODIMENTS

Figure 1:
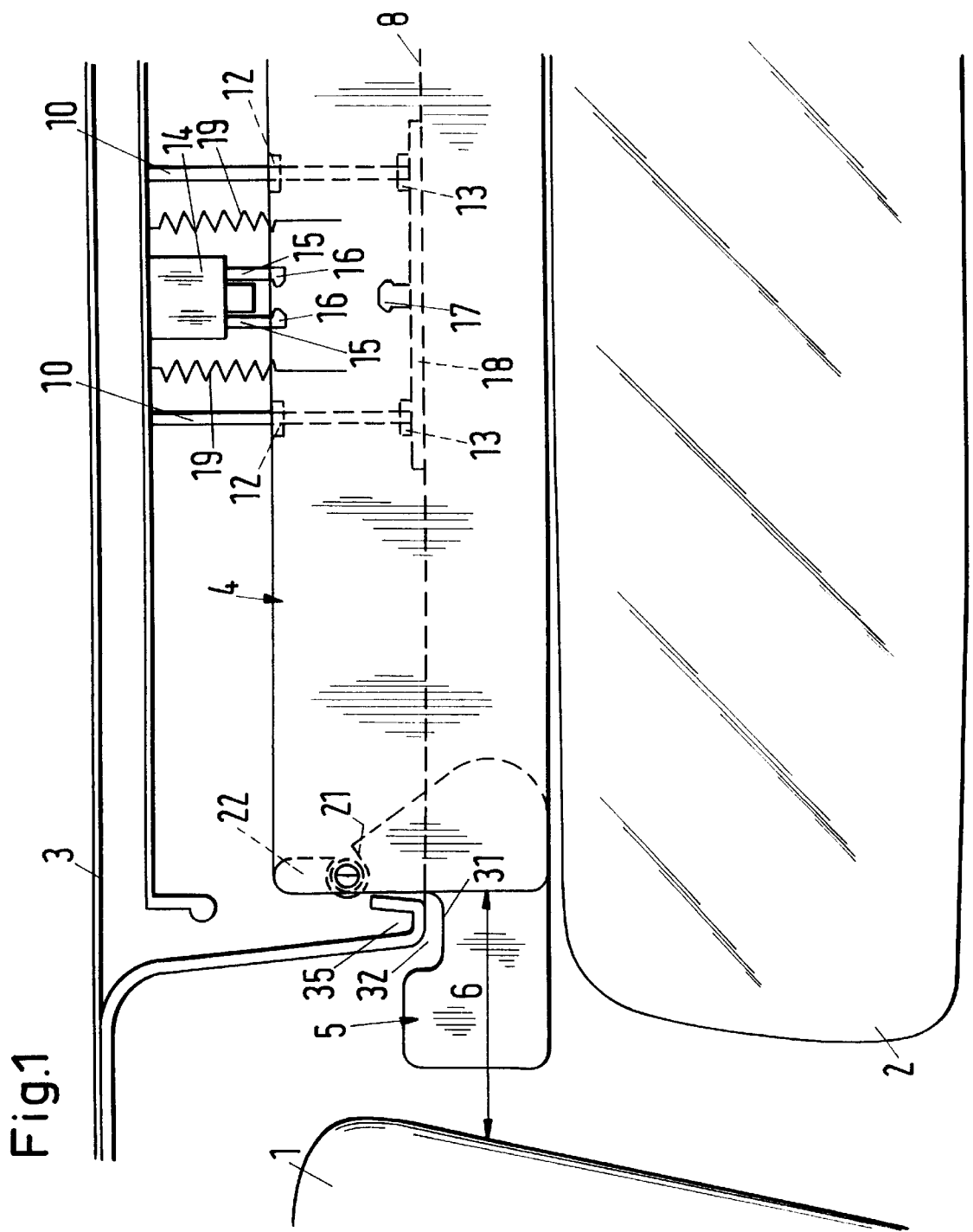
FIG. 1 shows in a schematic illustration and in an end view a sun visor according to the invention whose screen part is in the position of use.

Sun visors are provided in motor vehicles on the driver side and the front passenger side and can be pivoted from the stowed position downwardly into a position where they perform their shading function. FIG. 1 shows a portion of the driver side sun visor 1 which is of a conventional configuration. It is positioned at a spacing adjacent to the interior rearview mirror 2 which is attached in a manner known in the art on the vehicle. In the area between the interior rearview mirror 2 and the roof 3 of the vehicle an additional sun visor 4 is positioned. This sun visor 4 can be moved from the stowed position illustrated in FIG. 3 downwardly into a shading position illustrated in FIG. 1. The sun visor 4 has a rectangular contour. As illustrated in FIG. 4, the sun visor 4 is a hollow body and comprises a screen part 5 arranged at the end of the hollow body. The screen part 5 can be moved from the rest position (FIG. 3) into a position of use (FIG. 1). The area 6 located between the sun visor 4 positioned in the shading position and the sun visor 1 also positioned in the shading position can be at least partially closed or shaded by means of the screen part 5.

At the end of the sun visor 4 facing the front passenger sun visor such a screen part 5 can also be provided in order to cover or close at least partially the area between the sun visor 4 positioned in its shading position and the sun visor for the front passenger when in its shading position.

The inner cross-section of the sun visor 4 is only so large that the wing-shaped screen part 5 can be easily moved from the rest position into the position of use. The sun visor 4 itself is adjustable in the direction of its height from its shading position into the stowed position and vice versa. In the stowed position the sun visor 4, together with the screen part 5, is arranged in a receptacle 7 (FIG. 4) which is arranged so as to be hidden within the inner roof cover 8 of the vehicle. The inner roof cover 8 surrounds in the illustrated embodiment the mirror base 9 (FIG. 4) which is attached in a manner known in the art to the vehicle roof 3. In the receptacle 7 two parallel and spaced apart guides 10 are provided which extend vertically and are advantageously of a rod-shaped configuration. The sun visor 4 has eyes 12 and 13 at its backside 11 facing the windshield. The eyes 12, 13 are positioned at a spacing above one another and guide the sun visor 4 on the guides 10.

In the area between the guides 10 positioned symmetrically to the transverse center plane of the sun visor 4, a snap connector 14 (push-push element) is provided on the vehicle which comprises two snap tongues 15 which are positioned parallel to one another and point downwardly. The free ends 16 of the snap tongues 15 are widened in the direction toward one another and form snap noses which co-operate with a counter element 17 provided on the sun visor 4. The counter element 17 is mushroom-shaped and projects from a support 18 which is provided at the lower eyes 13 of the sun visor 4.

The sun visor 4 is loaded in the direction of its position of use by at least one pressure spring 19. In the illustrated embodiment, two pressure springs 19 are provided which are arranged in the area between the guides 10 and the snap connector 14, wherein one spring end is connected to the receptacle 7 and the other spring end is connected to the sun visor 4, respectively.

In the stowed position (FIG. 3), the sun visor 4 is moved upwardly to such an extent that it is positioned within the receptacle 7 and thus does not project at all or projects only slightly downwardly past the inner roof cover 8. The free ends 16 of the snap tongues 15 engage behind the mushroom-shaped counter element 17 of the sun visor 4 so that the sun visor 4 is securely snapped into place in its stowed position. The screen part 5 is also in its rest position in which it is completely positioned within a chamber or receiving element of the sun visor 4 and thus also within the receptacle 7. The screen part 5 is pivotable about an axle 20 which is provided in the vicinity of the edge of the sun visor 4 facing the sun visor 1 at the driver side. On the axle 20 a torsion spring 21 is provided which loads the screen part 5 in the direction of its position of use. As a result of the force of the torsion spring 21 acting on the screen part 5, the screen part 5 rests with its projecting tongue 22 against a stop 23 which is advantageously provided on the receptacle 7 but may also be provided on the vehicle roof 3. The tongue 22 is positioned with an advantageously planar outer side 24 against the stop 23. In the rest position according to FIG. 3, the outer side 24 is horizontal. It has a curved transition into a straight outer side 25 which is positioned at an obtuse angle to the outer side 24 and extends in the direction toward the vehicle roof. A straight edge 26 adjoins with an arc-shaped portion this straight outer side 25. The straight edge 26 is vertically positioned in the rest position of the screen part 5 and extends into close proximity of the lower edge 27 of the sun visor 4. The edge 26 has a curved transition into a straight edge 28 which is positioned at a right angle to the edge 26 and extends in the direction toward the sun visor 1 at the driver side. At a spacing from the narrow side 29 the edge 28 has a curved transition into an upwardly oriented straight edge 30 which extends parallel to the edge 26 but is significantly shorter than the edge 26. The edge 30 has a curved transition into a bottom 31 of a depression 32. The bottom 31 which extends parallel to the edges 26 and 30 has a curved or arc-shaped transition into a straight edge 33 which extends parallel to the outer side 24 of the tongue 22 and has a transition in the form of a semi-circular curved end face 34 of the tongue 22 into its outer sides 24.

Figure 3:
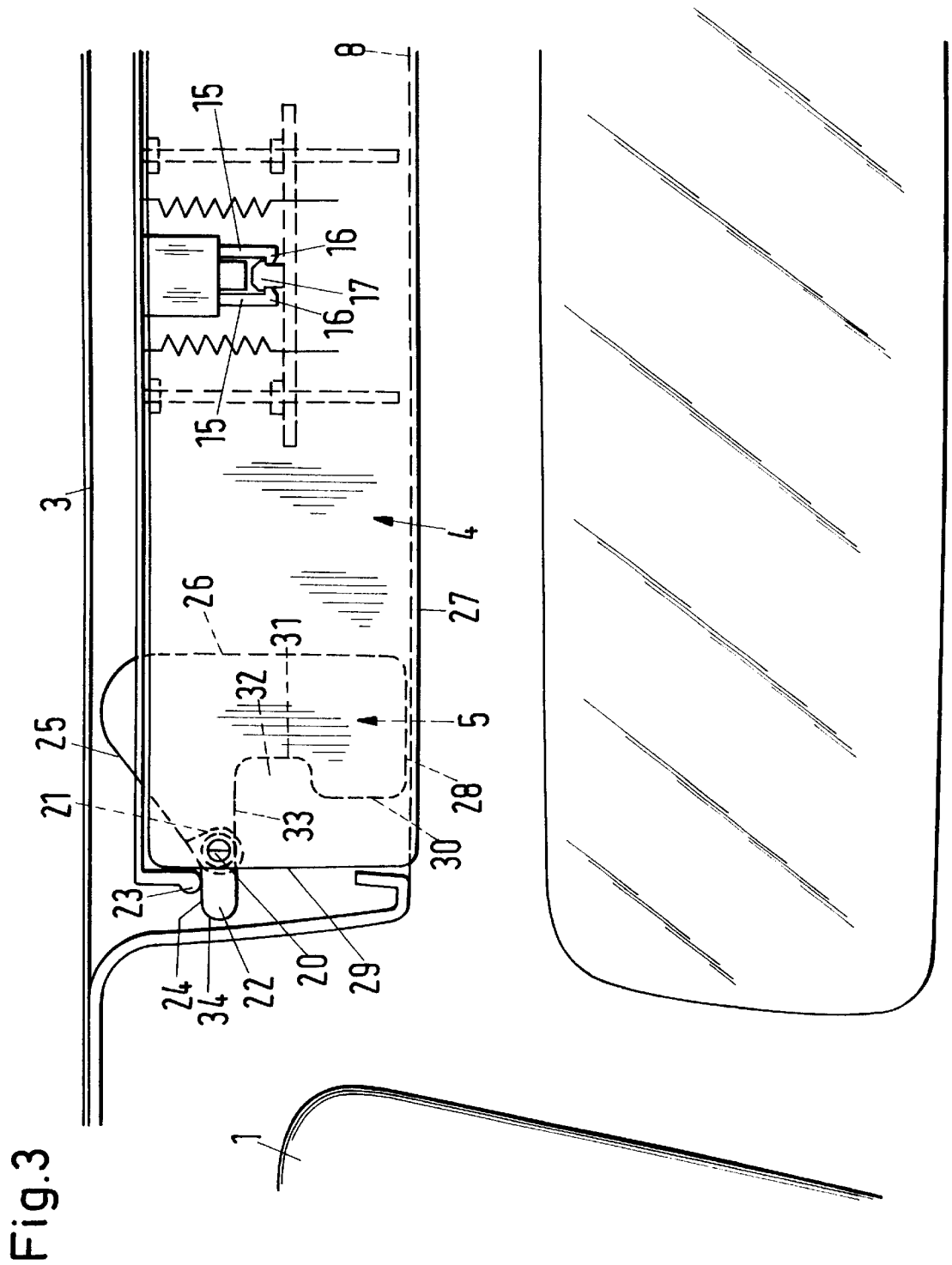
FIG. 3 shows the sun visor according to FIG. 1 whose screen part is in the rest position.
Figure 4:
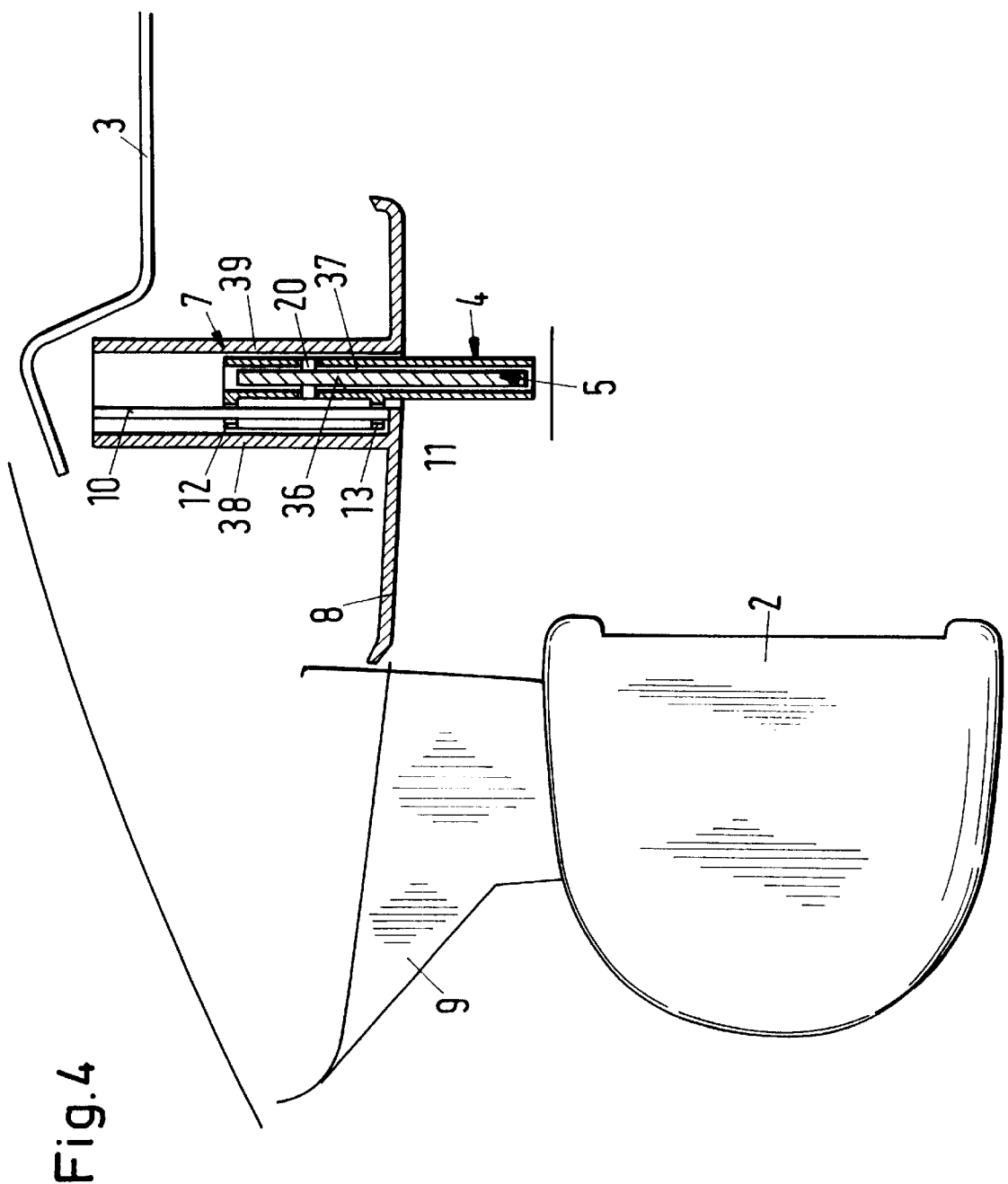
FIG. 4 is a cross-sectional view of the sun visor according to the invention.

In the rest position illustrated in FIG. 3, the tongue 22 of the screen part 5 projects past the, end face 29 of the sun visor 4. The stop 23 is also positioned external to the sun visor 4.

In order to move the sun visor 4 into the shading position, it is first loaded manually in the direction of the snap connector 14 so that, as is known in the art, the snap tongues 15 release the counter element 17 of the sun visor 4. The sun visor 4 is then moved by the force of the pressure springs 19 downwardly out of the receptacle 7.

Figure 2:
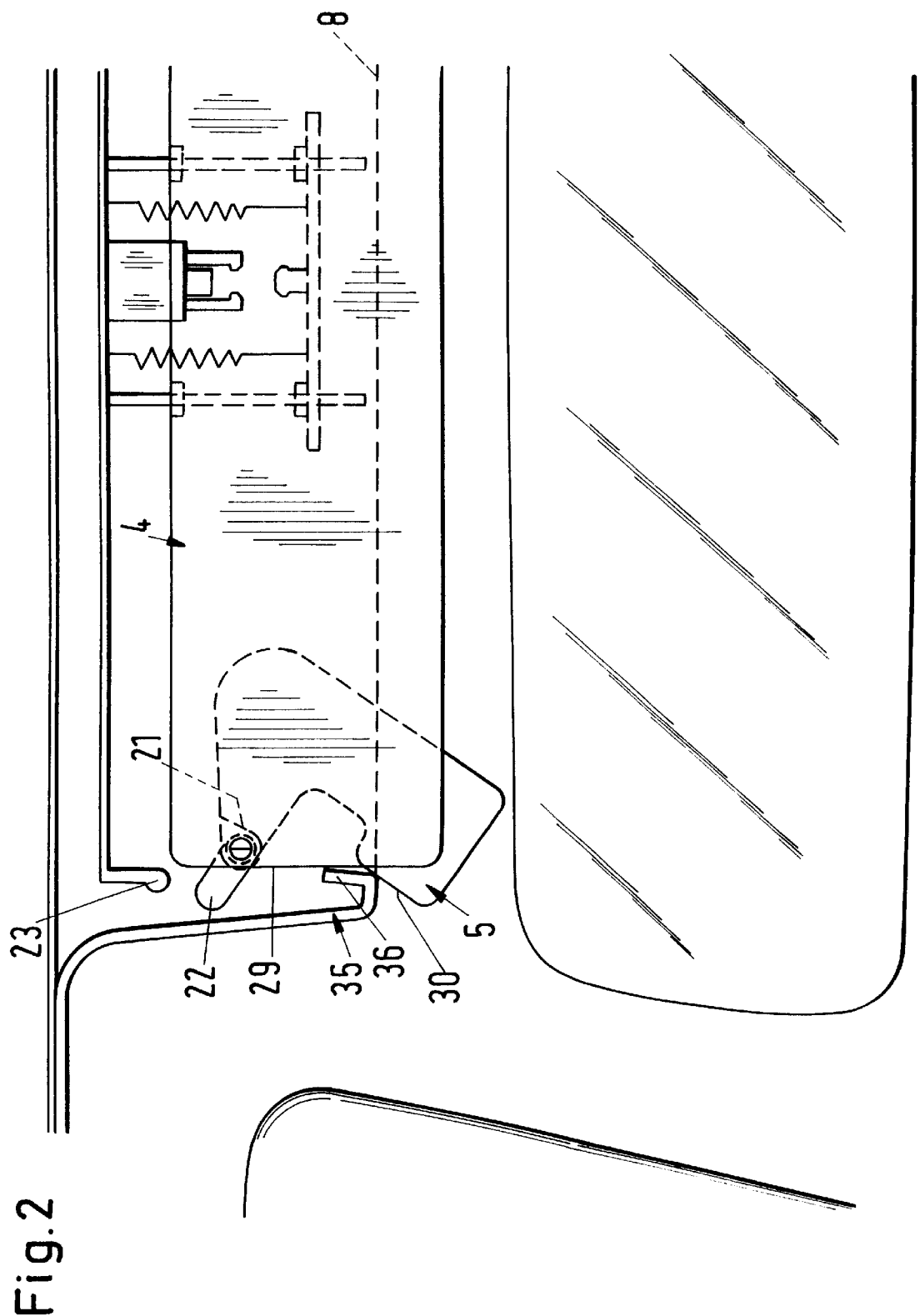
FIG. 2 shows in an illustration corresponding to FIG. 1 the sun visor whose screen part is in an intermediate position.

FIG. 2 shows an intermediate or center position of the sun visor 4 which is moved partially downwardly out of the receptacle 7. When moving the sun visor 4, the screen parts 5 is also entrained. The screen part 5 is initially supported by the force of the torsion spring 21 on the stop 23. A guide part 35 which is U-shaped in cross-section is positioned at a spacing opposite to the stop 23. The free leg 36 is oriented upwardly in the direction toward the stop 23. It has a minimal spacing from the narrow side 29 of the sun visor 4 so that the sun visor 4, when being moved, does not come into contact with the leg 36. The spacing of the leg 36 from the stop 23 is selected such that the screen part 5, as soon as the tongue 22 is released by the stop 23, will come to rest with its edge 30 on the guide part 35 (FIG. 2). The screen part 5 is positioned with its edge 30 under the force of the torsion spring 21 on the guide part 35. Upon further outward movement of the sun visor 4, the screen part 5 is moved farther along the guide part 35 and is pivoted by the torsion spring 21 until the guide part 35 reaches the depression 32 of the screen part 5 (FIG. 1). In this position the screen part 5, in comparison to the rest position according to FIG. 3, is rotated by 90° about the axle 20. The position of use of the screen part 5 illustrated in FIG. 1 is determined by a stop (not illustrated) which is provided on the sun visor 4. The screen part 5 projects in the direction toward the sun visor 1 provided at the driver side and covers thus the area 6 between the centrally arranged sun visor 4 and the sun visor 1 at the driver side.

The guide part 35 is advantageously a component of the roof cover 8 across which the centrally arranged sun visor 4 reaches into close proximity of the interior rearview mirror 2, when viewed in the travel direction.

The screen part 5 reaches in the described way automatically its shading position (position of use) when the sun visor 4 is moved out of the receptacle 7 in the downward direction. As illustrated in FIG. 4, the screen part 5 is spaced from the parallel positioned inner sides 36, 37 of the sidewalls 38, 39 of the receptacle 7 so that the screen part 5 can be reliably pivoted. The lower position of use (shading position) of the sun visor 4 is determined by the lower eyes 13 which rest against the inner side of the roof cover 8 within the receptacle 7 in the extended position of the sun visor 4.

The sun visor 4 can be moved against the force of the pressure springs 19 into the receptacle 7 until the counter element 17 snaps into place in the snap tongues 15 of the snap element 14 (FIG. 3). When moving the sun visor 4 back into the receptacle 7, first the bottom 31 of the depression 32 of the screen part 5 will come to rest against the guide part 35. Subsequently, the screen part 5 is pivoted against the force of the torsion spring 21 in the counter-clockwise direction during further reverse movement as a result of its contact on the guide part 35. During this movement, the screen part 5 glides relative to the guide part 35 so that it is pivoted in a forced way about the axle 20. The tongue 22, which in the position of use of the screen part 5 (FIG. 1) is completely positioned within the sun visor 4, reaches again the area between the stop 23 and the guide part 35 (FIG. 2). In this position, the screen part 5 is supported by means of its edge 30 on the guide part 35 under the force of the torsion spring 21. Upon further movement in the upward direction of the sun visor 4, the screen part 5 is finally pivoted into the rest position illustrated in FIG. 3 in which it rests with the tongue 22 against the stop 23 (FIG. 3).

Figure 5:
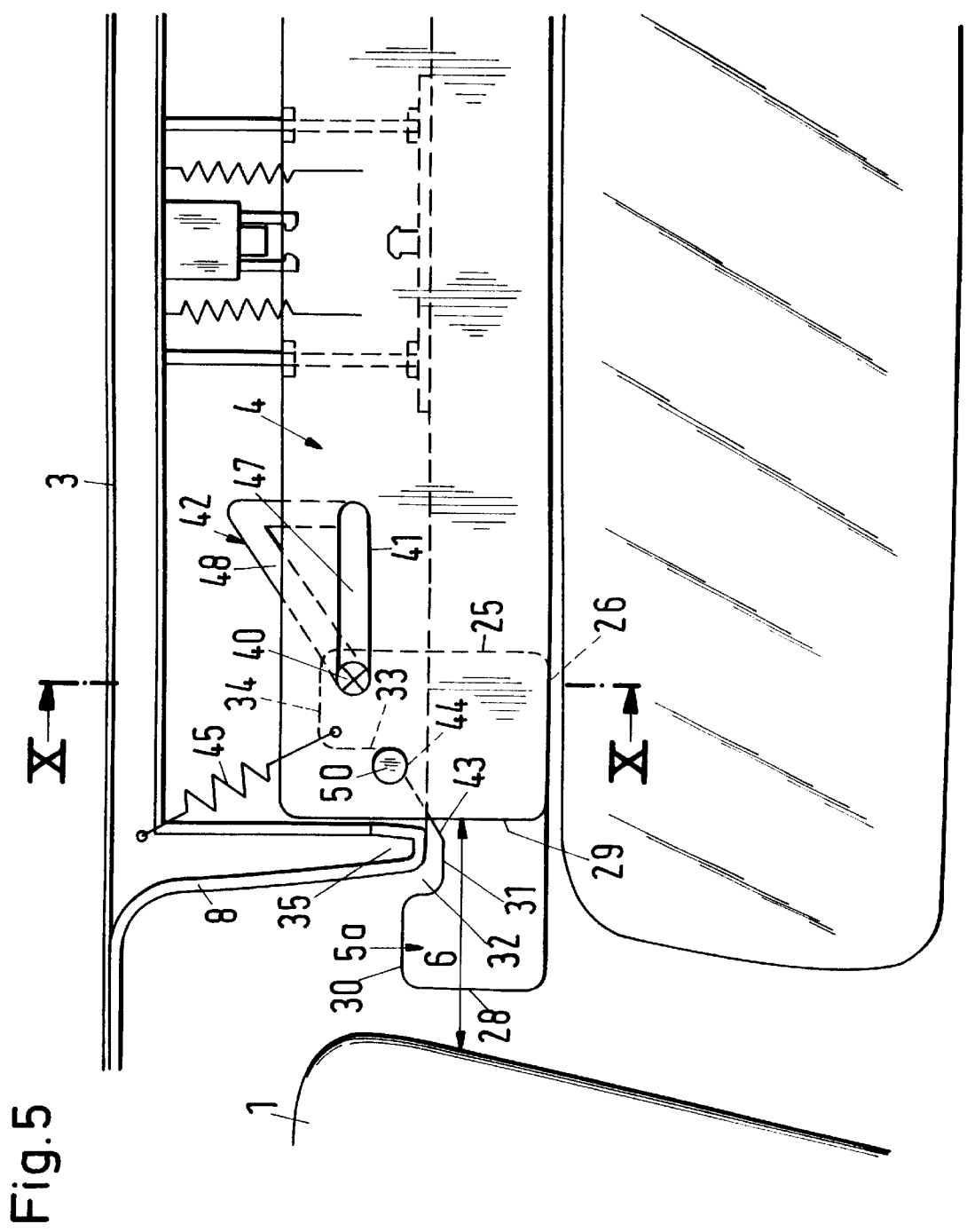
FIG. 5 shows in an illustration corresponding to FIG. 1 a second embodiment of the sun visor according to the invention whose screen part is in the position of use.
Figure 6:
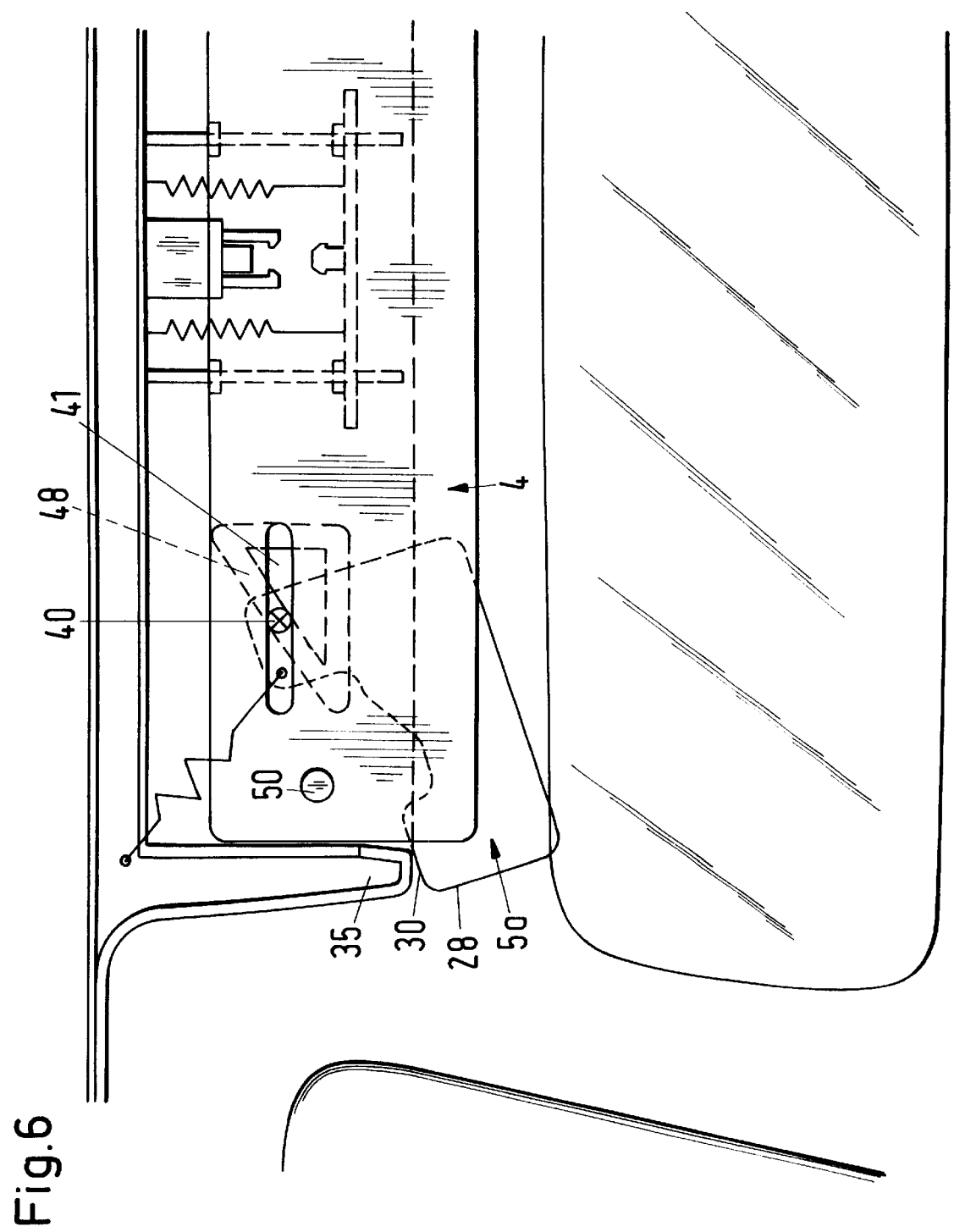
FIG. 6 shows the sun visor according to FIG. 5 whose screen part is in an intermediate position for being moved into the rest position.
Figure 7:
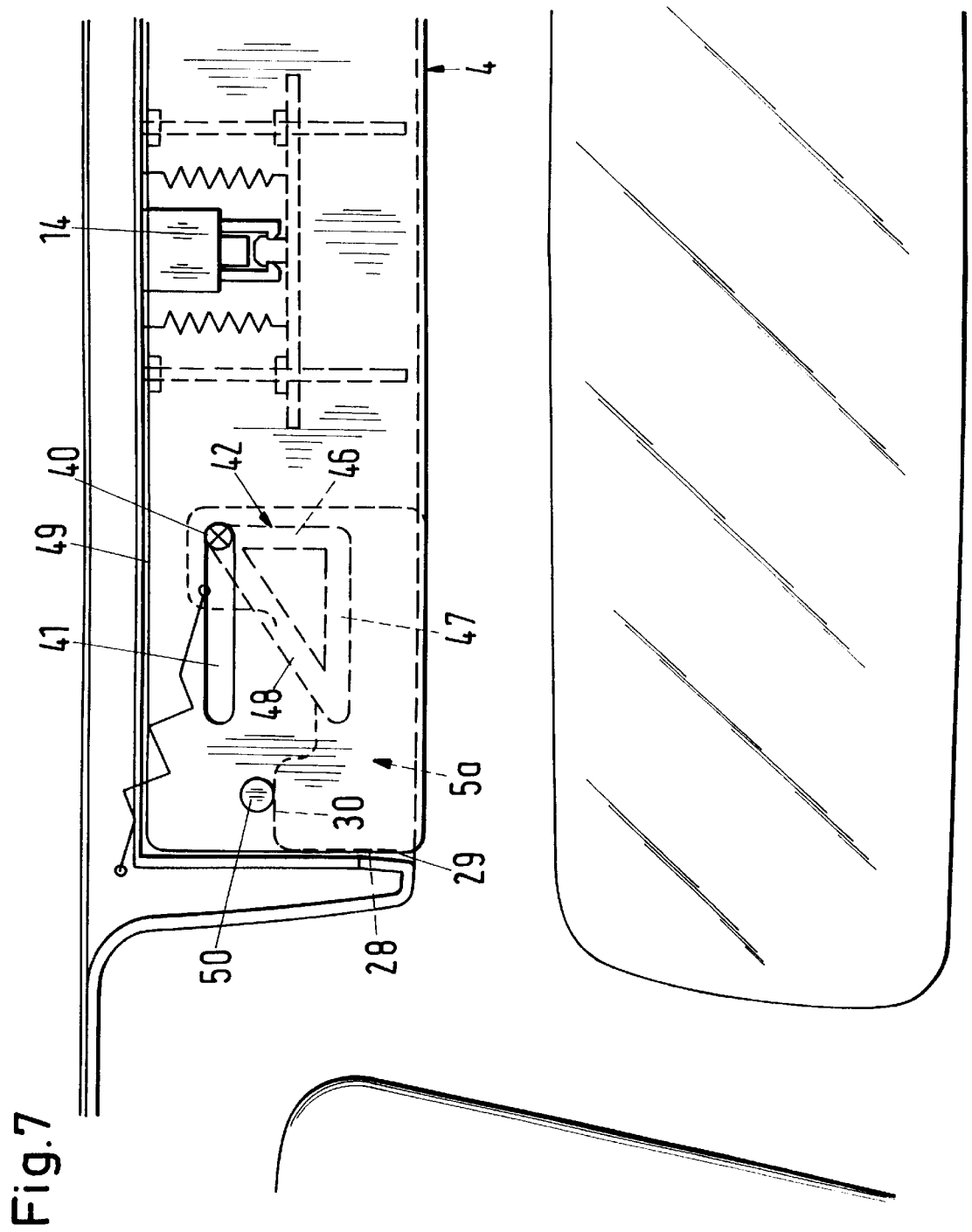
FIG. 7 shows the sun visor according to FIG. 5 in its stowed position.
Figure 10:
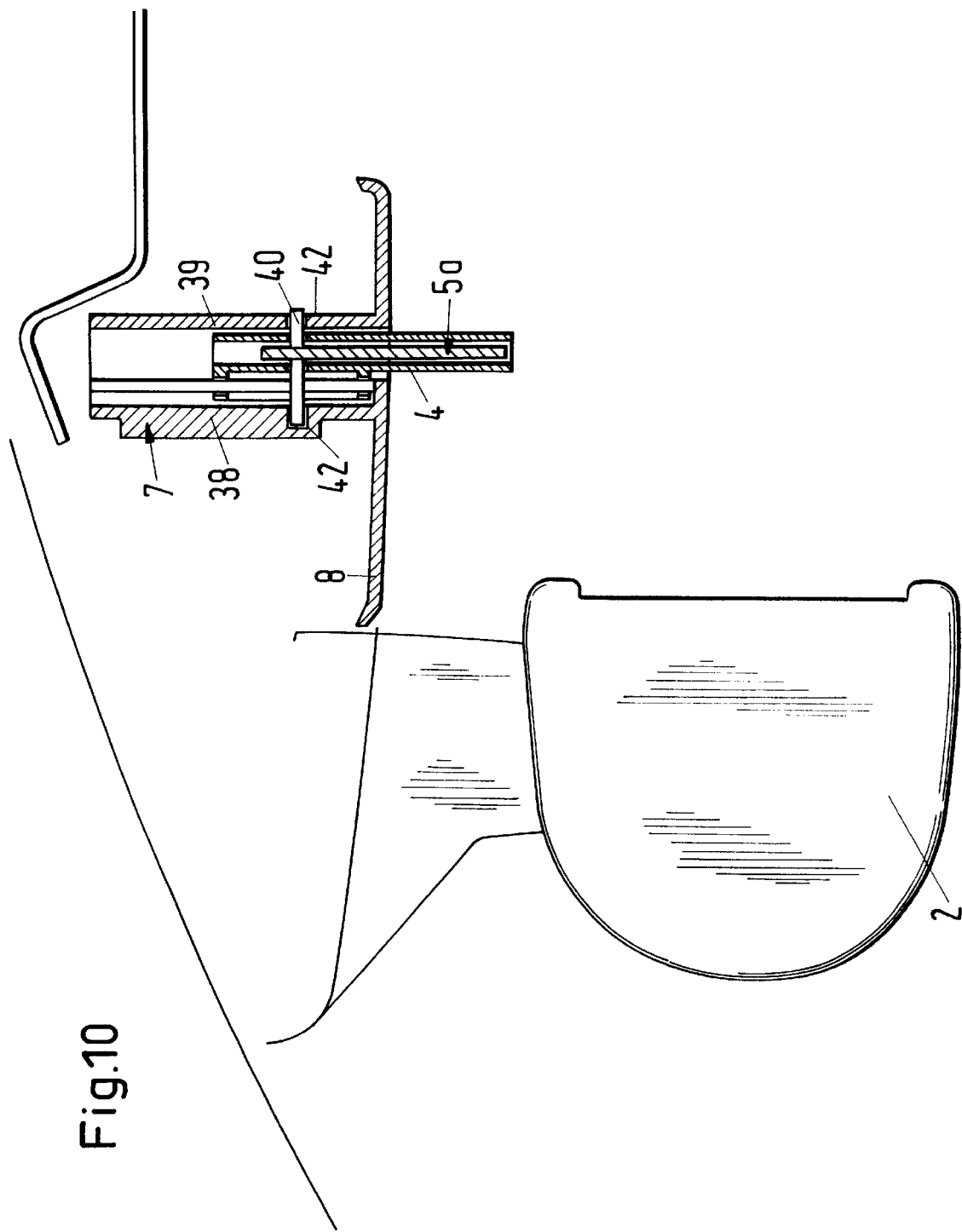
FIG. 10 is a section along the section line X—X of FIG. 5.

In the embodiment according to FIGS. 5 through 10, the screen part 5a is forced from the rest position illustrated in FIG. 7 into the position of use illustrated in FIG. 5 when the sun visor 4 is moved. The screen part 5a comprises a connecting link in the form of a guide bolt 40 which penetrates the screen part 5a (FIG. 10). In this embodiment, the sun visor 4 is also movable within the receptacle 7 which is advantageously a unitary or integral part of the roof cover 8. The sun visor 4 is provided with a guide 41 which extends parallel to its longitudinal direction and which is penetrated by the guide bolt 40. A triangular guide 42 is provided in the sidewalls 38, 39 of the receptacle 7, respectively. The guides 41, 42 and the bolt 40 form a forced guidance system. The guide 42 in the sidewall 38 is a depression and the guide 42 in the sidewall 39 is a penetration of the respective sidewall (FIG. 10). The sidewall 38 of the receptacle 7 is accordingly embodied to be thicker. The oppositely positioned sidewall 39 of the receptacle 7 can also be embodied to be thicker so that the guide 42 in the sidewall 39 can also be provided as a depression. However, it is also possible to provide both guides 42 as penetrations in the sidewalls 38, 39 of the receptacle 7.

The screen part 5a is substantially identical with the screen part 5 according to FIGS. 1 through 4. It is positioned with play within the sun visor 4 (FIG. 10) configured as a hollow body. In contrast to the previous embodiment, the bottom 31 of the depression 32 of the screen part 5a has an obtuse transition into a slanted edge 43 (FIG. 5). The slanted edge 43 has a transition via a short contact surface 44 into the perpendicularly positioned adjoining edge 33. The edge 33 is positioned parallel to the edge 25 which is connected via the straight end face 34 with the edge 33. The edge 25 adjoins perpendicularly the edge 26 which extends parallel to the end face 34 and adjoins at a right angle the edge 28. The edge 28, in turn, adjoins the edge 30.

At the transition area between the edges 33 and 34 of the screen part 5a one end of a tension spring 45 is fastened whose other end is connected on the vehicle roof cover 8 or the vehicle roof 3.

The guide 42 has a guide section 46 (FIG. 7) positioned in the movement direction of the sun visor 4. The lower end of the guide section 46 has a transition at a right angle into the guide section 47 extending in the direction toward the narrow side 29 of the sun visor 4. Section 47 is longer than the guide section 46. The end of the guide section 47 facing the narrow side 29 of the sun visor 4 has a transition at an acute angle into a straight guide section 48 which extends up to the upper end of the guide section 46. The length of the horizontal guide section 47 corresponds to the length of the guide 41 in the sun visor 4.

The sun visor 4 in the stowed position (FIG. 7) is hidden in the receptacle 7 and secured by the snap connector 14. The horizontal guide 41 in the sun visor 4, which is positioned with minimal spacing below the upper longitudinal side 49 of the sun visor 4, is positioned at the level of the upper end of the guide section 46 of the guide 42. The screen part 5a is hidden in the sun visor 4 and rests with its edge 30 on a stop 50 under the force of the tension spring 45. The stop 50 is arranged in the sun visor 4 and is advantageously embodied as a cylindrical pin. The edge 28 of the screen part 5a is positioned congruently with the narrow side 29 of the sun visor 4. The guide bolt 40 is positioned at the right end of the guide 41 as well as at the edge of the vertical guide section 46 at its upper end.

Figure 8:
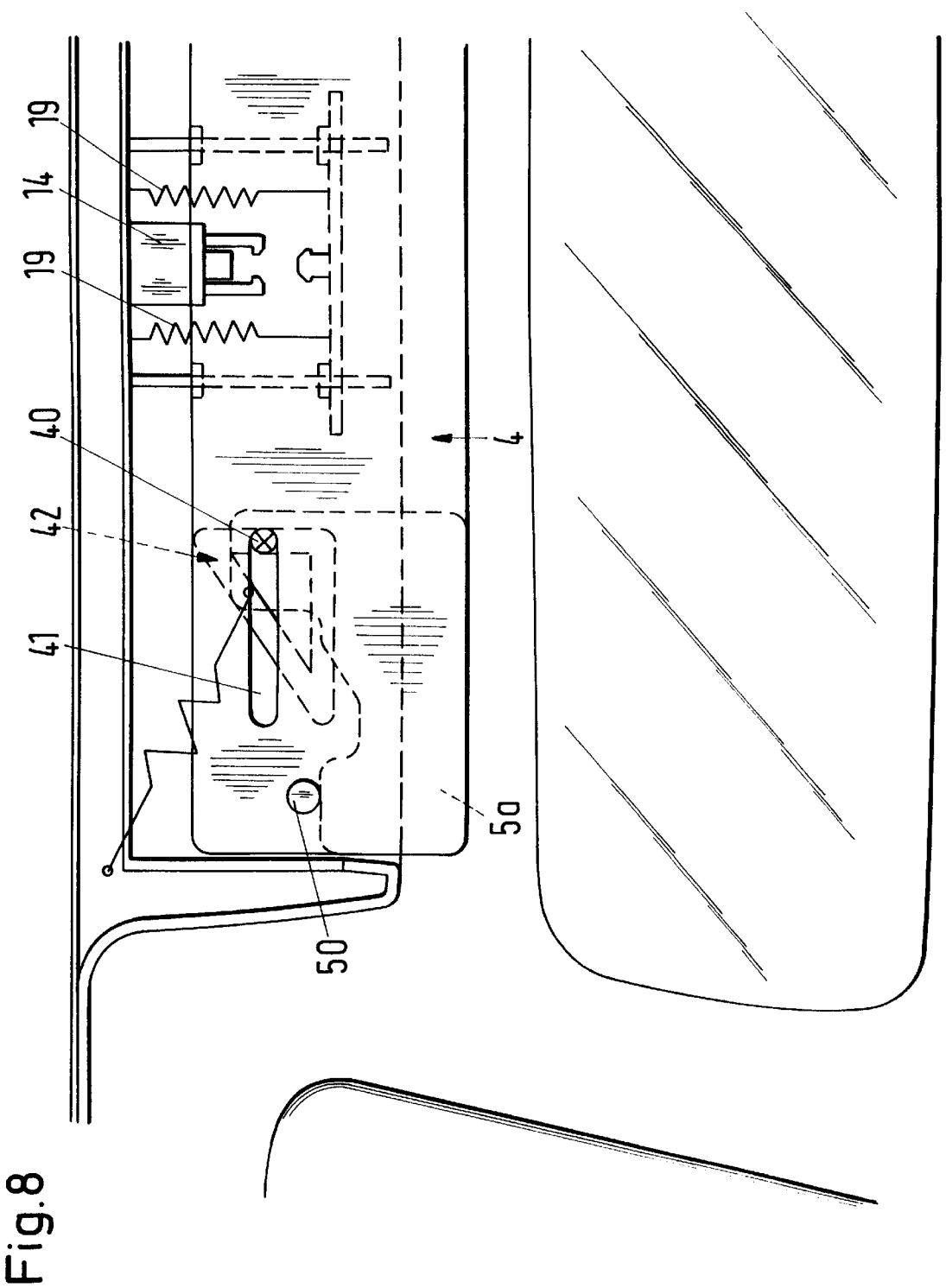
FIG. 8 shows the sun visor according to FIG. 5 whose screen part is in an intermediate position while being moved from the rest position into the position of use.
Figure 9:
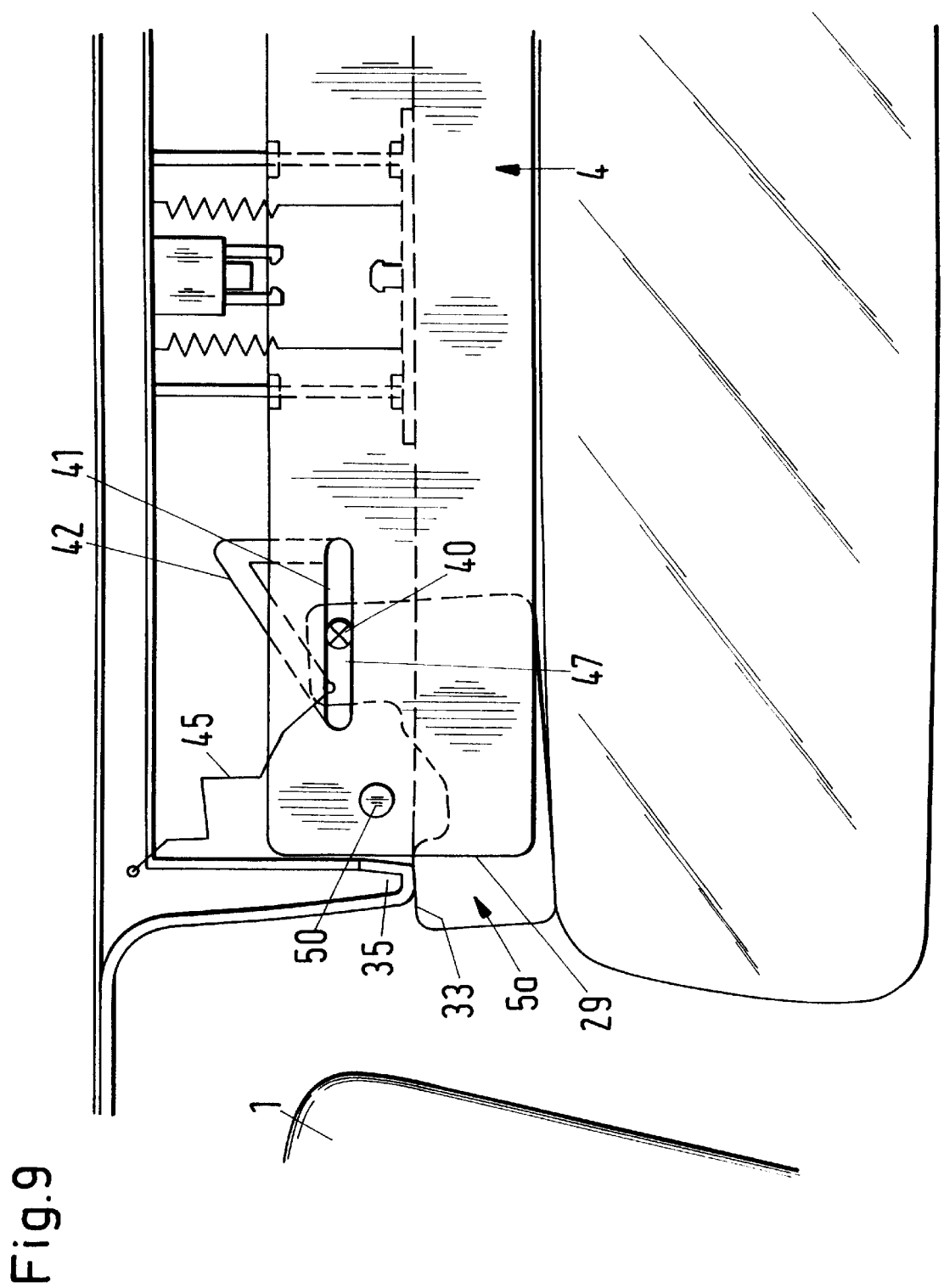
FIG. 9 shows the screen part in a further intermediate position shortly before reaching the position of use.

In order to move the sun visor 4 out of the receptacle 7, it is first slightly loaded in the upward direction so that the snap connector 14 will release the sun visor 4 in the way described in connection with the previous embodiment. It is then moved under the force of the two pressure springs 19 in the downward direction. In this connection, the horizontal guide 41 of the sun visor 4 is also moved downwardly. The guide bolt 40 penetrating the guide 41 is also entrained in the downward direction and glides in the vertical guide section 46 of the guide 42 in the downward direction. This has the result that the screen part 5a first maintains its position relative to the sun visor 4 (FIG. 8). As soon as the sun visor 4 has been moved downwardly out of the receptacle 7 to such an extent that the guide bolt 40 of the screen part 5a is positioned at the level of the lower horizontal guide section 47 (FIG. 9), the screen part 5a is moved under the force of the tension spring 49 laterally past the narrow side 29 out of the sun visor 4. Since the guide 41 of the sun visor 4 and the guide section 47 of the guide 42 are congruently positioned at this point, the guide bolt 40 is moved in the guide 41 and in the guide section 47 to the left in the direction toward the narrow side 29 of the sun visor 4. The guide bolt 40 has advantageously a circular cross-section so that it is easily moved. The diameter of the guide bolt 40 corresponds to the width of the guide 41 and the width of the guide sections 46 to 48. The screen part 5a is moved in the guide 41 as well as in the guide section 47 by the tension spring 45.

As long as the guide bolt 40 is still positioned within the vertical guide section 46, the screen part 5a rests with its edge 30 on the stop 50 of the sun visor 4 (FIG. 8). As soon as the guide bolt 40 is positioned at the level of the horizontal guide section 47 and the sun visor 4 has been moved farther downwardly out of the receptacle 7, the screen part 5a reaches the guide part 35 under the force of the tension spring 45. This has the result that the screen part 5a is pivoted slightly downwardly in the counter-clockwise direction about the axis of the guide bolt 40 by the guide part 35a. As a result of the action of the tension spring 45, the edge 33 of the screen part 5a thus comes to rest against the guide part 35 (FIG. 9), so that the screen part 5a is released from the stop 50 of the sun visor 4. The screen part 5a can then be moved farther outwardly by means of the tension spring 45 in the direction toward the sun visor 1 at the driver side into the position of use illustrated in FIG. 5. The position of use is determined in that the screen part 5a comes to rest with the contact surface 44 on the stop 50 of the sun visor 4 under the force of the tension spring 45 (FIG. 5). In this position of use the screen part 5a is positioned at a spacing to the guide part 35 which projects with play into the depression 32 of the screen part 5a. The guide bolt 40 is positioned in the position of use of the screen part 5a on the right end (FIG. 5) of the guide 41 and of the guide section 47 of the guide 42. Accordingly, the screen part 5a is reliably secured by the stop 50 and the guide bolt 40. Below the guide part 35 of the roof cover 8, the screen part 5a projects past the narrow side 29 of the sun visor 4 in the direction toward the sun visor 1 at the driver side and covers substantially the area 6 between the two sun visors 14.

When the sun visor 4 is moved back from the position of use according to FIG. 5 into the receptacle 7, the guide bolt 40 is forced into the upwardly slanted guide section 48 of the guide 42 (FIG. 6). Upon upward movement of the sun visor 4, the guide bolt 40 is thus moved in the guide 41 in FIG. 6 to the right and at the same time in the slanted guide section 48 upwardly at a slant. The screen part 5a is thus released from the stop 50 of the sun visor 4. Moreover, the screen part 5a, in cooperation with the guide part 35, is pivoted counterclockwise wherein the screen part 5a with its edge 30 comes to rest against the guide part 35. Upon further upward movement of the sun visor 4, the screen part 5a glides with its edge 28 along the guide part 35 until the screen part 5a with its edge 30 comes to rests against the stop 50 (FIG. 7). In this position, the screen part 5a is securely positioned by means of the stop 50 and the guide bolt 40.

The sun visor 4 with the screen part 5, 5a is positioned, when viewed in the travel direction of the vehicle, advantageously in front of the interior rearview mirror 2 (FIG. 10) so that the sun visor 4 can be easily moved by the driver into the stowed position or into the shading position. The driver must only move the sun visor 4 because the screen part 5, 5a is forced into the rest position or into the position of use by the movement of the sun visor 4. With the screen part 5, 5a the area 6 between the centrally arranged sun visor 4 and the sun visor 1 at the driver side is substantially covered so that the sunlight cannot blind the driver within this area. The sun visor 4 itself can be simply moved by the corresponding movement into the respective position. The screen part 5, 5a is stowed in the rest position in a protective way within the sun visor 4. It is, of course, possible to embody the sun visor 4 differently than a hollow body. Also, when the sun visor 4 is only a simple screen, the screen part 5, 5a can be arranged and guided at the backside of the sun visor 4 facing away from the driver in the way described above.

While specific embodiments of the invention have been shown and described in detail to illustrate the inventive principles, it will be understood that the invention may be embodied otherwise without departing from such principles.

What is claimed is:

1. A sun visor arrangement for a motor vehicle, wherein said sun visor arrangement is connected to at least one support of the motor vehicle and is configured to be moveable from a stowed position into a shading position; said sun visor arrangement comprising:
   a sun visor (4) and one or more screen parts (5, 5a) connected to said sun visor (4), wherein said one or more screen parts (5, 5a) is configured to be moveable from a rest position into a position of use and back; and
   a forced guidance system (40–42) configured to guide said one or more screen parts (5a) from said rest position into said position of use and back, wherein said forced guidance system (40–42) comprises a first guide (41) provided on said sun visor (4) and a connecting link (40) provided on said one or more screen parts (5a), wherein said connecting link (40) engages said first guide (41);
   wherein said forced guidance system (40–42) further comprises a second guide (42) provided on the vehicle, wherein said connecting link (40) engages said second guide (42).

2. The sun visor arrangement according to claim 1, wherein said one or more screen parts (5,5a) is configured to carry out a compulsory movement from said rest position into said position of use.

3. The sun visor arrangement according to claim 1, wherein said one or more screen parts (5, 5a) is pivotably supported on said sun visor (4).

4. The sun visor arrangement according to claim 1, further comprising at least one stop (23, 50) configured to support said one or more screen parts (5, 5a) in said rest position.

5. The sun visor arrangement according to claim 4, wherein said one or more screen parts (5, 5a) is forced against said at least one stop (23) by a spring force.

6. The sun visor arrangement according to claim 1, wherein said one or more screen parts (5, 5a) in said rest position is at least partially covered by said sun visor (4).

7. The sun visor arrangement according to claim 1, further comprising at least one stop (50) configured to support said one or more screen-parts (5, 5a) in said position of use.

8. The sun visor arrangement according to claim 7, wherein said one or more screen parts (5, 5a) is forced against said at least one stop (50) by a spring force.

9. The sun visor arrangement according to claim 1, wherein said one or more screen parts (5, 5a) projects past an edge of said sun visor (4) away from said sun visor (4).

10. The sun visor arrangement according to claim 1, wherein said one or more screen parts (5, 5a) is configured to undergo a forced movement from said rest position into said position of use and back when said sun visor (4) is moved.

11. A The sun visor arrangement according to claim 1, further comprising at least one spring (21, 45) configured to load said one or more screen parts (5, 5a) in a direction toward said position of use.

12. The sun visor arrangement according to claim 1, wherein said one or more screen parts (5, 5a) is configured to move translatorily from said rest position into said position of use.

13. The sun visor arrangement according to claim 1, wherein said second guide (42) has three guide sections (46–48) arranged in a triangle shape and adjoining one another.

14. The sun visor arrangement according to clam 13, wherein a first one (47) of said three guide sections (46–48) extends horizontally and wherein a second one (46) of said guide sections (46–48) extends vertically.

15. The sun visor arrangement according to claim 1, wherein said first guide (41) is an opening penetrating said sun visor (4) and extending in a longitudinal direction of said sun visor (4).

16. The sun visor arrangement according to claim 1, wherein said sun visor (4) is vertically moveable for moving said sun visor (4) from the stowed position into the shading position and back.

17. The sun visor arrangement according to claim 16, further comprising at least one snap connector (14) configured to secure said sun visor (4) in said rest position.

18. The sun visor arrangement according to claim 1, further comprising a receptacle (7) configured to receive said sun visor (4) when in said stowed position.

19. The sun visor arrangement according to claim 1, wherein said one or more screen parts (5, 5a) in said position of use projects past a narrow side (29) of said sun visor (4) away from said sun visor (4).

20. The sun visor arrangement according to claim 1, wherein said sun visor (4) has at least one chamber for receiving said one or more screen parts (5, 5a).

21. The sun visor arrangement according to claim 20, wherein said sun visor (4) is a hollow body.

22. The sun visor arrangement according to claim 20, wherein said sun visor (4) is configured to be mounted between a driver side sun visor and a passenger side sun visor of the motor vehicle.

23. The sun visor arrangement according to claim 22, wherein said one or more screen parts (5, 5a) in said position of use covers at least partially an area (6) between said sun visor (4) and at least one of the driver side sun visor and the passenger side sun visor of the motor vehicle.

* * * * *